United States Patent
Ito et al.

(10) Patent No.: US 12,104,294 B2
(45) Date of Patent: Oct. 1, 2024

(54) COMPOSITE YARN FABRIC AND METHOD FOR PRODUCING FIBER-REINFORCED RESIN MOLDED ARTICLE USING SAME

(71) Applicant: NITTO BOSEKI CO., LTD., Fukushima (JP)

(72) Inventors: Hirotaka Ito, Fukushima (JP); Noriyoshi Sato, Fukushima (JP); Junya Sakata, Gunma (JP)

(73) Assignee: Nitto Boseki Co., Ltd., Fukushima (JP)

( * ) Notice: Subject to any disclaimer, the term of this patent is extended or adjusted under 35 U.S.C. 154(b) by 576 days.

(21) Appl. No.: 17/420,548

(22) PCT Filed: Apr. 2, 2020

(86) PCT No.: PCT/JP2020/015184
§ 371 (c)(1),
(2) Date: Jul. 2, 2021

(87) PCT Pub. No.: WO2020/213416
PCT Pub. Date: Oct. 22, 2020

(65) Prior Publication Data
US 2022/0119993 A1    Apr. 21, 2022

(30) Foreign Application Priority Data

Apr. 17, 2019   (JP) ................................ 2019-078287

(51) Int. Cl.
| | | |
|---|---|---|
| *D03D 15/47* | (2021.01) | |
| *B29C 70/46* | (2006.01) | |
| *B29K 77/00* | (2006.01) | |
| *B29K 105/08* | (2006.01) | |
| *B29K 309/08* | (2006.01) | |
| *D03D 15/267* | (2021.01) | |
| *D03D 15/283* | (2021.01) | |
| *D03D 15/573* | (2021.01) | |
| *D03D 15/587* | (2021.01) | |

(52) U.S. Cl.
CPC ........... *D03D 15/47* (2021.01); *B29C 70/465* (2013.01); *D03D 15/267* (2021.01); *D03D 15/283* (2021.01); *D03D 15/573* (2021.01); *D03D 15/587* (2021.01); *B29K 2077/00* (2013.01); *B29K 2105/0845* (2013.01); *B29K 2309/08* (2013.01); *D10B 2505/02* (2013.01)

(58) Field of Classification Search
CPC .... D03D 15/47; D03D 15/267; D03D 15/283; D03D 15/573; D03D 15/587; D03D 1/00; B29C 70/465; B29K 2077/00; B29K 2105/0845; B29K 2309/08; D02G 3/00; D02G 3/402; D10B 2505/02; D10B 2101/06; D10B 2401/041; D10B 2331/02
See application file for complete search history.

(56) References Cited

U.S. PATENT DOCUMENTS

| | | | |
|---|---|---|---|
| 5,110,681 A | 5/1992 | Satake et al. | |
| 5,175,034 A * | 12/1992 | Andre De La Porte | ..................... D03D 11/02 428/116 |
| 2015/0240396 A1* | 8/2015 | Hayashi | ................ B32B 27/308 156/196 |
| 2016/0010246 A1* | 1/2016 | Nakai | .................... D02G 3/402 28/165 |
| 2020/0002484 A1* | 1/2020 | Nakai | ..................... B32B 5/245 |

FOREIGN PATENT DOCUMENTS

| | | | |
|---|---|---|---|
| CN | 102080283 A | | 6/2011 |
| CN | 107385594 A | | 11/2017 |
| DE | 42 43 465 A1 | | 7/1993 |
| EP | 0 302 989 A2 | | 2/1989 |
| JP | H01-111040 A | | 4/1989 |
| JP | H01-198635 A | | 8/1989 |
| JP | H11-320737 A | | 11/1999 |
| JP | 2001-064836 A | | 3/2001 |
| JP | 2001164411 A | * | 6/2001 |
| JP | 2014-173196 A | | 9/2014 |
| JP | 2015-101794 A | | 6/2015 |
| JP | 2020-075384 A | | 5/2020 |

OTHER PUBLICATIONS

English translation of JP-2001164411-A retrieved from Espacenet on Aug. 5, 2024 (Year: 2024).*
Extended European search report dated Jun. 20, 2022 issued in the corresponding EP Patent Application No. 20791585.1.
Office Action dated Mar. 16, 2023 issued in the corresponding Chinese Patent Application No. 202080008275.3 with the English translation thereof.

* cited by examiner

*Primary Examiner* — Emmanuel S Luk
*Assistant Examiner* — Elisa H Vera
(74) *Attorney, Agent, or Firm* — Carrier, Shende & Associates P.C.; Joseph P. Carrier; Fulchand P. Shende

(57) ABSTRACT

A composite yarn fabric which can be suitably used as a material of a fiber-reinforced resin molded article is provided. The composite yarn fabric is obtained by weaving using composite yarns as at least one of the warp or the weft, the composite yarns obtained by doubling and twisting inorganic multifilament yarns and thermoplastic resin yarns. The inorganic multifilament yarns have a mass of 10 to 65 tex, monofilaments constituting the inorganic multifilament yarns have a fiber diameter of 6.6 to 9.5 μm, a melt flow rate of a thermoplastic resin constituting the thermoplastic resin yarns is 34 to 100 g/10 minutes, and a ratio of a mass of the inorganic multifilament yarns to a total mass of the composite yarns is 40 to 90% by mass.

6 Claims, No Drawings

COMPOSITE YARN FABRIC AND METHOD FOR PRODUCING FIBER-REINFORCED RESIN MOLDED ARTICLE USING SAME

TECHNICAL FIELD

The present invention relates to a composite yarn fabric and a method for manufacturing a fiber-reinforced resin molded article using the composite yarn fabric.

BACKGROUND ART

Fiber-reinforced resin molded articles obtained by heating thermoplastic pre-preg for molding under pressure have been used as lightened materials used for airplanes, cars, general industrial machines, and the like until now. The thermoplastic pre-preg is obtained by stacking inorganic fiber fabrics and films made of a thermoplastic resin, melting the thermoplastic resin forming the films made of the thermoplastic resin by heating, and impregnating spaces between inorganic fibers constituting the inorganic fiber fabrics with the thermoplastic resin.

However, a problem is that, since the thermoplastic resin has high viscosity when the thermoplastic resin is melted, in the case of the thermoplastic pre-preg, the spaces between the inorganic fibers are less likely to be impregnated with the molten thermoplastic resin, and voids easily occurred.

To solve the problem, it has been examined to perform weaving using composite yarns as at least one of the warp or the weft, the composite yarns obtained by doubling and twisting inorganic multifilament yarns and thermoplastic resin yarns, to thereby form a composite yarn fabric. According to the composite yarn fabric, the composite yarn fabric is heated and molded under pressure to melt the thermoplastic resin yarns forming the composite yarns and impregnate the inorganic multifilament yarns with the thermoplastic resin for molding simultaneously, and thus the fiber-reinforced resin molded article can be obtained at once. According to the fiber-reinforced resin molded article, it is expected that more excellent formability can be obtained than when the thermoplastic pre-preg is used.

As the composite yarn fabric, for example, known is those obtained by using composite yarns obtained by doubling and twisting E glass fiber yarns (glass fiber yarns having an E glass composition) as the inorganic multifilament yarns and polyamide fiber yarns as the thermoplastic resin yarns (for example, refer to Patent Literature 1).

CITATION LIST

Patent Literature

Patent Literature 1: Japanese Patent Laid-Open No. 2001-64836

SUMMARY OF INVENTION

Technical Problem

However, the composite yarn fabric described in Patent Literature 1 is used for a nonflammable cloth which is flexible, feels soft, and is excellent in nonflammability and abrasion resistance, and there is trouble of the composite yarn fabric being difficultly used for a material of a fiber-reinforced resin molded article having high strength.

An object of the present invention is to solve such trouble and provide a composite yarn fabric which can be suitably used as a material of a fiber-reinforced resin molded article having high strength and a method for manufacturing a fiber-reinforced resin molded article using it.

Solution to Problem

To achieve such an object, a composite yarn fabric of the present invention is a composite yarn fabric obtained by weaving using composite yarns as at least one of the warp or the weft, the composite yarns obtained by doubling and twisting inorganic multifilament yarns and thermoplastic resin yarns, and is characterized in that the inorganic multifilament yarns have a mass in the range of 10 to 65 tex, monofilaments constituting the inorganic multifilament yarns have a fiber diameter in the range of 6.6 to 9.5 µm, a melt flow rate (hereinafter occasionally referred to as an MFR) of a thermoplastic resin constituting the thermoplastic resin yarns is 34 to 100 g/10 minutes, and a ratio of a mass of the inorganic multifilament yarns to a total mass of the composite yarns is in the range of 40 to 90% by mass.

The composite yarn fabric of the present invention enables obtaining excellent weavability by weaving using the composite yarns obtained by doubling and twisting the inorganic multifilament yarns and the thermoplastic resin yarns. Although the composite yarns may be used as at least one of the warp or the weft in the composite yarn fabric of the present invention, the composite yarns may be used as both the warp and the weft.

When, in the composite yarn fabric of the present invention, the inorganic multifilament yarns have a mass in the range of 10 to 65 tex, the monofilaments constituting the inorganic multifilament yarns have a fiber diameter in the range of 6.6 to 9.5 µm, the melt flow rate of the thermoplastic resin constituting the thermoplastic resin yarns is in the range of 34 to 100 g/10 minutes, and the ratio of the mass of the inorganic multifilament yarns to the total mass of the composite yarns is in the range of 40 to 90% by mass, the thermoplastic resin can obtain excellent impregnatability into the inorganic multifilament yarns at the time of heating the composite yarn fabric and melting the thermoplastic resin yarns. Consequently, when the composite yarn fabric of the present invention is heated and molded under pressure, excellent moldability and formability can be obtained, and the fiber-reinforced resin molded article having high strength can be obtained in the case of the composite yarn fabric.

When the mass of the inorganic multifilament yarns is out of the range, the fiber diameter of the monofilaments constituting the inorganic multifilament yarns is out of the range, the MFR) of the resin constituting the thermoplastic resin yarns is out of the range, or the ratio of the mass of the inorganic multifilament yarns to the total mass of the composite yarns is out of the range, the thermoplastic resin cannot be fully impregnated into the inorganic multifilament yarns, and enough moldability and formability, and high strength of the fiber-reinforced resin molded article cannot be obtained simultaneously. The high strength of the fiber-reinforced resin molded article intensity herein means having a bending modulus of elasticity of the molded article of 20 GPa or more, more preferably 22 GPa or more.

In the composite yarn fabric of the present invention, for example, glass fiber yarns can be used as the inorganic multifilament yarns.

In the composite yarn fabric of the present invention, polyamide resin yarns can be used as the thermoplastic resin yarns.

A method for manufacturing a fiber-reinforced resin molded article of the present invention comprises a molding step of heating and pressing one sheet of the composite yarn fabric or a stacked body in which a plurality of sheets of the composite yarn fabric is stacked.

According to the method for manufacturing a fiber-reinforced resin molded article of the present invention, a molded article can be obtained by heating and pressing the composite yarn fabric excellent in moldability and formability, and efficiency in the manufacturing of molded articles can be improved.

DESCRIPTION OF EMBODIMENTS

Next, embodiments of the present invention will be described in further detail.

A composite yarn fabric of the present embodiment is obtained by weaving using composite yarns as at least one of the warp or the weft, the composite yarns obtained by doubling and twisting inorganic multifilament yarns and thermoplastic resin yarns.

In the composite yarn fabric of the present embodiment, for example, glass fiber yarns and carbon fiber yarns can be used as the inorganic multifilament yarns. It is preferable to use the glass fiber yarns as the inorganic multifilament yarns from the viewpoint of securing the insulation of a fiber-reinforced resin molded article.

It is preferable to use glass fiber yarns having an E glass composition as the glass fiber yarns from the viewpoint of versatility. The E glass composition is a composition containing $SiO_2$ in the range of 52.0 to 56.0% by mass, $B_2O_3$ in the range of 5.0 to 10.0% by mass, $Al_2O_3$ in the range of 12.0 to 16.0% by mass, CaO and MgO in the range of 20 to 25% by mass in total, and $Li_2O$, $K_2O$, and $Na_2O$ in the range of 0 to 1.0% by mass in total based on the total amount of the glass fibers.

It is preferable to use glass fiber yarns having a high-strength high-elastic modulus glass composition (a composition containing $SiO_2$ in the range of 64.0 to 66.0% by mass, $Al_2O_3$ in the range of 24.0 to 26.0% by mass, and MgO in the range of 9.0 to 11.0% by mass based on the total amount of the glass fibers) or a high-elastic modulus easily manufactured glass composition (composition containing $SiO_2$ in the range of 57.0 to 60.0% by mass, $Al_2O_3$ in the range of 17.5 to 20.0% by mass, MgO in the range of 8.5 to 12.0% by mass, CaO in the range of 10.0 to 13.0% by mass, and $B_2O_3$ in the range of 0.5 to 1.5% by mass and containing $SiO_2$, $Al_2O_3$, MgO, and CaO in the range of 98.0% by mass or more in total based on the total amount of the glass fibers) as the glass fiber yarns from the viewpoint of enhancing the strength (for example, a bending modulus of elasticity) of the fiber-reinforced resin molded article. It is preferable to use glass fiber yarns having a low-dielectric constant low-dielectric loss tangent glass composition (a composition containing $SiO_2$ in the range of 48.0 to 62.0% by mass, $B_2O_3$ in the range of 17.0 to 26.0% by mass, $Al_2O_3$ in the range of 9.0 to 18.0% by mass, CaO in the range of 0.1 to 9.0% by mass, MgO in the range of 0 to 6.0% by mass, $Na_2O$, $K_2O$, and $Li_2O$ in the range of 0.05 to 0.5% by mass in total, $TiO_2$ in the range of 0 to 5.0% by mass, SrO in the range of 0 to 6.0% by mass, $F_2$ and $Cl_2$ in the range of 0 to 3.0% by mass in total, and $P_2O_5$ in the range of 0 to 6.0% by mass based on the total amount of the glass fibers) as the glass fiber yarns from the viewpoint of reducing the dielectric loss of the fiber-reinforced resin molded article.

The contents of components constituting the glass fiber yarns can be measured using an ICP emission spectrophotometer as to B, which is a light element, and using a wavelength dispersive fluorescent X-ray analyzer as to the other elements.

As the measuring method, composite yarns containing glass fiber yarns is first heated, for example, in a muffle furnace at 300 to 600° C. for around 2 to 24 hours, and organic matter is removed. Subsequently, a platinum crucible is charged with the glass fiber yarns, the glass fiber yarns is maintained at a temperature of 1550° C. for 6 hours in an electric furnace and melted with stirring to obtain homogeneous molten glass. Next, the obtained molten glass is allowed to flow out to a carbon plate to produce glass cullet, and the glass cullet is then pulverized and powdered. The glass powder is pyrolyzed with acid, quantitative analysis is then performed using the ICP emission spectrophotometer as to Li, which is a light element. The glass powder is molded into the shape of a disk with a press, and the other elements are then subjected to quantitative analysis using the wavelength dispersive fluorescent X-ray analyzer. These quantitative analysis results are converted into oxides to calculate the contents of components and the total amount. The contents of the components (% by mass) can be calculated from these numerical values.

In the composite yarn fabric of the present embodiment, the inorganic multifilament yarns have a mass in the range of 10 to 65 tex. The inorganic multifilament yarns preferably have a mass in the range of 15 to 60 tex, more preferably have a mass in the range of 20 to 55 tex, further preferably have a mass in the range of 23 to 50 tex, particularly preferably have a mass in the range of 26 to 45 tex, and the most preferably have a mass in the range of 30 to 40 tex from the viewpoint of securing excellent moldability (ease of being impregnated with the thermoplastic resin). The mass of the inorganic multifilament yarns can be measured based on JIS R 3420:2013.

Each of the inorganic multifilament yarns may be a bundle of only inorganic monofilaments. In the composite yarn fabric of the present embodiment, monofilaments constituting the inorganic multifilament yarns have a fiber diameter in the range of 6.6 to 9.5 μm. The monofilaments preferably have a fiber diameter in the range of 7.1 to 9.4 μm, more preferably have a fiber diameter in the range of 7.6 to 9.3 μm, particularly preferably have a fiber diameter in the range of 8.1 to 9.2 μm, and the most preferably have a fiber diameter in the range of 8.6 to 9.2 μm from the viewpoint of securing excellent moldability (ease of being impregnated with the thermoplastic resin). The fiber diameter of the monofilaments constituting the inorganic multifilament yarns can be measured based on JIS R 3420:2013.

In the composite yarn fabric of the present embodiment, the inorganic multifilament yarns have a mass in the range with, for example, 40 to 380 monofilaments having a fiber diameter in the range bundled. The inorganic multifilament yarns preferably have a mass in the range with, for example, 50 to 300 monofilaments having a fiber diameter in the range bundled, more preferably have a mass in the range with 100 to 280 monofilaments bundled, further preferably have a mass in the range with 150 to 250 monofilaments bundled, and particularly preferably have a mass in the range with 180 to 220 monofilaments bundled from the viewpoint of securing excellent moldability (ease of being impregnated with the thermoplastic resin).

In the composite yarn fabric of the present embodiment, the inorganic multifilament yarns may be subjected to bulky processing. Bulky processing is one of methods for processing fibers also called textured processing. For example, when the inorganic multifilament yarns are glass fiber yarns, glass fiber yarns are fed to a high-speed air jet nozzle at a constant drawing speed, and the glass fiber yarns are exposed to air turbulence at a winding speed lower than the drawing speed, and the glass fiber yarns are opened to perform bulky processing.

In the composite yarn fabric of the present embodiment, for example, polyamide resin yarns, polyphenylene sulfide resin yarns, polybutylene terephthalate resin yarns, polycarbonate resin yarns, and the like can be used as the thermoplastic resin yarns. Since excellent impregnatability into the inorganic multifilament yarns is compatible with excellent strength of the fiber-reinforced resin molded article (for example, a bending modulus of elasticity), the polyamide resin yarns are preferably used as the thermoplastic resin yarns.

As the polyamide resin, for example, polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), polymetaxylylene adipamide, polymetaxylylene dodecamide, polyamide 9T, polyamide 9MT, and the like can be used. Since the strength of the fiber-reinforced resin molded article and the impregnatability into the inorganic multifilament yarns are excellent in good balance, among these, polyamide 6 (hereafter occasionally referred to as PA6) is preferable.

In the composite yarn fabric of the present embodiment, the melt flow rate of the thermoplastic resin constituting the thermoplastic resin yarns is in the range of 34 to 100 g/10 minutes. The melt flow rate of the thermoplastic resin is preferably in the range of 35 to 98 g/10 minutes, more preferably in the range of 36 to 97 g/10 minutes, further preferably in the range of 37 to 95 g/10 minutes, particularly preferably in the range of 38 to 92 g/10 minutes, especially preferably in the range of 39 to 90 g/10 minutes, and the most preferably in the range of 39 to 85 g/10 minutes from the viewpoint of securing the impregnatability into the inorganic multifilament yarns more surely.

The melt flow rate of the thermoplastic resin can be measured based on ISO 1133 according to the temperature conditions and the load conditions specified depending on the type of the thermoplastic resin. For example, when the thermoplastic resin is polyamide 6, the melt flow rate can be measured under the conditions of 230° C. and a load of 2160 g. When the thermoplastic resin is polyphenylene sulfide resin, the melt flow rate can be measured under the conditions of 316° C. and a load of 5000 g.

In the composite yarn fabric of the present embodiment, the thermoplastic resin constituting the thermoplastic resin yarns preferably has a melting point in the range of 160 to 280° C., and more preferably have a melting point in the range of 210 to 240° C. from the viewpoint of guaranteeing the ease of molding processing. The melting point of the resin can be measured based on JIS K 7121.

The thermoplastic resin can be moved from the inorganic multifilament yarn to collect the thermoplastic resin by pressing the composite yarn fabric of the present embodiment under the temperature condition of 20° C. or more higher than the melting point of the thermoplastic resin constituting the thermoplastic resin yarns, for example, at a high pressure of 4 MPa or more. As to the collected thermoplastic resin, the type of the thermoplastic resin can be identified using FT-IR, and the MFR and the melting point can be measured by the above-described method.

In the composite yarn fabric of the present embodiment, the ratio of the mass of the inorganic multifilament yarns to the total mass of the composite yarns is in the range of 40 to 90% by mass. The ratio of the mass of the inorganic multifilament yarns to the total mass of the composite yarns is preferably 50 to 80% by mass, and more preferably 55 to 70% by mass from the viewpoint of securing excellent strength (for example, a bending modulus of elasticity) of the fiber-reinforced resin molded article. The mass of the composite yarns (M1) is measured, and the mass after the composite yarns are heated, for example, at 625° C. for 1 hour to remove the thermoplastic resin (M2) is measured. The ratio of the mass of the inorganic multifilament yarns to the total mass of the composite yarns can be calculated from M2/M1.

In the composite yarn fabric of the present embodiment, the composite yarns can be obtained by doubling and twisting 1 to 3 inorganic multifilament yarns and 1 to 3 thermoplastic resin yarns with a well-known yarn twisting machine.

In the composite yarn fabric of the present embodiment, the number of the twists of the composite yarns is, for example, 1.3 to 6.3 times/25 mm. The number of the twists of the composite yarns is preferably 2.3 to 5.3 times/25 mm and more preferably 2.8 to 4.8 times/25 mm from the viewpoint of manufacturing a fabric having inorganic fibers with little rupture, curvature, and distortion. The direction of the twists is not particularly limited.

In the composite yarn fabric of the present embodiment, the composite yarn fabric can be obtained by using the composite yarns as at least one of the warp or the weft, for example, using the composite yarns as the weft, for example, by weaving at a weaving density of 18 to 50 yarns/25 mm in the longitudinal direction and 18 to 40 yarns/25 mm in the transverse direction. Examples of the weave structure of the composite yarn fabric include plain weaves, twill weaves, satin weaves, and mat weaves.

A method for manufacturing a fiber-reinforced resin molded article of the present embodiment comprises a molding step of heating and pressing one sheet of the composite yarn fabric or a stacked body in which a plurality of sheets of the composite yarn fabric is stacked. In the heating and pressing, examples of the heating condition include a temperature 20 to 40° C. higher than the melting point of the resin constituting the thermoplastic resin yarns in the composite yarn fabric. In the heating and pressing, examples of the pressing conditions include a pressure of 0.5 to 5.0 MPa for 1 to 10 minutes.

A fiber-reinforced resin molded article manufactured by the method for manufacturing a fiber-reinforced resin molded article of the present embodiment can be effectively used, for example, for manufacturing electrical and electronic parts, auto parts, industrial parts, fibers, films, sheets, and other various molded articles in any shapes and for any uses.

Examples of the electrical and electronic parts include SMT connectors such as FPC connectors, BtoB connectors, card connectors, and coaxial connectors; SMT switches; SMT relays; an SMT bobbins; memory card connectors; CPU sockets; LED reflector; bases, barrels, and holders of camera modules; electric cable coverings; optical fiber parts; silence gears of AV and OA equipment; automatic blinking equipment parts; cellular phone parts; heat-resistant gears for copying machines; end caps; commutators; sockets for business use; command switches; noise filters; magnet switches; solar battery substrates; liquid crystal boards; LED mounting boards; flexible printed wiring boards; and flexible flat cables.

Examples of the auto parts include cooling parts such as thermostat housings, radiator tanks, radiator hoses, water outlets, water pump housings, and rear joints; air intake and exhaust system parts such as intercooler tanks, intercooler cases, turbo duct pipes, EGR cooler cases, resonators, throttle bodies, intake manifolds, and tail pipes; fuel system parts such as fuel delivery pipes, gasoline tanks, quick connectors, canisters, pump modules, fuel piping, oil strainers, lock nuts, and sealants; structural parts such as mount brackets, torque rods, and cylinder head covers; drive system parts such as bearing retainers, gear tensioners, head lamp actuator gears, slide door rollers, and clutch peripheral parts; braking system parts such as air brake tubes; in-car electrical and electronic parts such as wire harness connectors in engine rooms, motor parts, sensors, ABS bobbins, combination switches, and in-car switches; interior and exterior parts such as slide door dampers, door mirror stays, door mirror brackets, inner mirror stays, roof rails, engine mount brackets, inlet pipes of air cleaners, door checkers, plastic chains, emblems, clips, breaker covers, cup holders, air bags, fenders, spoilers, radiator supports, radiator grilles, louvers, air scoops, hood bulges, backdoors, and fuel sender modules.

Examples of the industrial parts include gas pipes, pipes for oil field mining, hoses, anti-termite cables (communication cables, path cables, and the like), painted portions of powder coated articles (coating of insides of water pipes), submarine oil field pipes, pressure-resistant hoses, hydraulic tubes, tubes for painting, fuel pumps, separators, ducts for super charge, butterfly valves, conveyer roller bearings, tie spring holders for railways, outboard motor engine covers, engine covers for dynamos, valves for irrigation, large switches, and monofilaments (extruded yarns) such as fishing nets.

Examples of the fibers include foundation cloths for air bags, heat-resistant filters, reinforced fibers, bristles for brushes, fishing lines, tire cords, artificial lawn, carpets, and fibers for seats.

Examples of the films and the sheets include heat-resistant adhesive tapes such as heat-resistant masking tapes and industrial tapes; materials for magnetic tapes such as cassette tapes, magnetic tapes for data storages for digital data storages, and videotapes; food packaging materials such as pouches of retort-pouch foods, individual packing of confectionery, and packing of processed meat products; and packaging materials for electronic parts such as packing for semiconductor packages.

Besides, the fiber-reinforced resin molded article of the present embodiment can be suitably used for bumpers, backdoors, fenders, seat frames, window frames, suspensions, body panels, oil pans, battery cases, electronic equipment cabinets, antenna cabinets, electronic circuit boards, house walls, pillars of buildings, plastic magnets, shoe soles, tennis rackets, skis, bonded magnets, spectacle frames, binding bands, tag pins, crescents for sashes, fans for power tool motors, insulating blocks for motor stators, engine covers for lawn mowers, fuel tanks of lawn mowers, ultrasmall slide switches, DIP switches, housings of switches, lamp sockets, shells of connectors, IC sockets, bobbin covers, relay boxes, capacitor cases, small motor cases, gears, cams, dancing pulleys, spacers, insulators, fasteners, casters, wire clips, wheels for bicycles, terminal blocks, insulating portions of starters, fuse boxes, air cleaner cases, air conditioner fans, housings of terminals, wheel covers, bearing retainers, water pipe impellers, clutch release bearing hubs, heat-resistant containers, microwave oven parts, rice cooker parts, printer ribbon guides, and the like.

Next, the Examples and the Comparative Examples will be shown.

EXAMPLES

Example 1

In the present Example, first, one E glass fiber yarn in which 200 monofilaments having a fiber diameter of 9 μm were bundled and which had a yarn mass of 33.7 tex and one polyamide resin yarn comprising a polyamide resin having a MFR of 40 g/10 minutes and a melting point of 220° C. (PA6; manufactured by Ube Industries, Ltd., trade name: UBE1013B) and having a yarn mass of 23.3 tex were doubled and twisted with a yarn twisting machine to obtain a composite yarn twisted 3.8 times/25 mm. The ratio of the mass of the E glass fiber yarns to the total mass of the composite yarns was 59% by mass.

Next, a plain weave composite yarn fabric was obtained by weaving at a warp weaving density of 42 yarns/25 mm and a weft weaving density of 32 yarns/25 mm using the E glass fiber yarns as the warp and using the composite yarns obtained in the present Example as the weft.

Subsequently, the composite yarn fabric obtained in the present Example was heated to 250° C. and pressed under a pressure of 3 MPa for 1 minute to manufacture a platy molded article, and the moldability was evaluated. As to the obtained platy molded article, the bending modulus of elasticity of the molded article was measured based on ISO178. Table 1 shows the results.

In Table 1, when a platy molded article having no voids (portions which are not impregnated with the resin) can be manufactured under the heating and press conditions of a temperature 30° C. higher than the melting point of the resin constituting the thermoplastic resin yarns, 3 MPa, and 1 minute, the moldability is rated as "good", and when such a platy molded article cannot be manufactured, the moldability is rated as "poor".

Example 2

In the present Example, a composite yarn fabric was obtained in exactly the same way as in Example 1 except that one polyamide resin yarn comprising a polyamide resin having a MFR of 84 g/10 minutes and a melting point of 225° C. (PA6; manufactured by DSM Japan K.K., trade name: Novamid 1007J) and having a yarn mass of 23.3 tex was used.

Next, the composite yarn fabric obtained in the present Example was heated to 250° C. and pressed under a pressure of 3 MPa for 1 minute to manufacture a platy molded article, the moldability was evaluated in exactly the same way as in Example 1, and the bending modulus of elasticity of the molded article was measured. Table 1 shows the results.

Example 3

In the present Example, a composite yarn fabric was obtained in exactly the same way as in Example 1 except that one polyphenylene sulfide (PPS) resin yarn comprising a PPS resin having a MFR of 90 g/10 minutes and a melting point of 280° C. (manufactured by TORAY INDUSTRIES, INC., trade name: TORELINA E2080) and having a yarn mass of 23.3 tex was used.

Next, the composite yarn fabric obtained in the present Example was heated to 320° C. and pressed under a pressure of 3 MPa for 1 minute to manufacture a platy molded article, the moldability was evaluated in exactly the same way as in Example 1, and the bending modulus of elasticity of the molded article was measured. Table 1 shows the results.

Example 4

A composite yarn fabric was obtained in exactly the same way as in Example 1 except that one glass fiber yarn in which 200 monofilaments having a fiber diameter of 9 µm were bundled and which had a yarn mass of 33.7 tex and a high-strength high-elastic modulus glass composition (a glass composition comprising 65% by mass SiO$_2$, 25% by mass Al$_2$O$_3$, and 10% by mass MgO based on the total amount of the glass fibers) was used.

Next, the composite yarn fabric obtained in the present Example was heated to 250° C. and pressed under a pressure of 3 MPa for 1 minute to manufacture a platy molded article, the moldability was evaluated in exactly the same way as in Example 1, and the bending modulus of elasticity of the molded article was measured. Table 1 shows the results.

Comparative Example 1

In the present Comparative Example, a composite yarn fabric was obtained in exactly the same way as in Example 1 except that one E glass fiber yarn in which 800 monofilaments having a fiber diameter of 6.5 µm were bundled and which had a yarn mass of 67.5 tex and two polyamide resin yarns comprising a polyamide resin having a MFR of 40 g/10 minutes and a melting point of 220° C. (PA6; manufactured by Ube Industries, Ltd., trade name: UBE1013B) and having a yarn mass of 23.3 tex were doubled and twisted with a yarn twisting machine to obtain a composite yarn twisted 3.8 times/25 mm.

Next, the composite yarn fabric obtained in the present Comparative Example was heated to 250° C. and pressed under a pressure of 3 MPa for 1 minute to manufacture a platy molded article, the moldability was evaluated in exactly the same way as in Example 1, and the bending modulus of elasticity of the molded article was measured. Table 2 shows the results.

Comparative Example 2

In the present Comparative Example, a composite yarn fabric was obtained in exactly the same way as in Example 1 except that one E glass fiber yarn in which 400 monofilaments having a fiber diameter of 6.5 µm were bundled and which had a yarn mass of 33.7 tex was used instead of one E glass fiber yarn in which 200 monofilaments having a fiber diameter of 9 µm were bundled and which had a yarn mass of 33.7 tex.

Next, the composite yarn fabric obtained in the present Comparative Example was heated to 250° C. and pressed under a pressure of 3 MPa for 1 minute to manufacture a platy molded article, the moldability was evaluated in exactly the same way as in Example 1, and the bending modulus of elasticity of the molded article was measured. Table 2 shows the results.

Comparative Example 3

In the present Comparative Example, a composite yarn fabric was obtained in exactly the same way as in Example 1 except that one E glass fiber yarn in which 400 monofilaments having a fiber diameter of 9 µm were bundled and which had a yarn mass of 69.1 tex and two polyamide resin yarns comprising a polyamide resin having a MFR of 40 g/10 minutes and a melting point of 220° C. (PA6; manufactured by Ube Industries, Ltd., trade name: UBE1013B) and having a yarn mass of 23.3 tex were doubled and twisted with a yarn twisting machine to obtain a composite yarn twisted 3.8 times/25 mm.

Next, the composite yarn fabric obtained in the present Comparative Example was heated to 250° C. and pressed under a pressure of 3 MPa for 1 minute to manufacture a platy molded article, the moldability was evaluated in exactly the same way as in Example 1, and the bending modulus of elasticity of the molded article was measured. Table 2 shows the results.

Comparative Example 4

In the present Comparative Example, a composite yarn fabric was obtained in exactly the same way as in Example 1 except that one polyamide resin yarn comprising a polyamide resin having a MFR of 33 g/10 minutes and a melting point of 220° C. (PA6; manufactured by TORAY INDUSTRIES, INC., trade name: AMMAN CM1017) and having a yarn mass of 23.3 tex was used instead of one polyamide resin yarn comprising a polyamide resin having a MFR of 40 g/10 minutes and a melting point of 220° C. and having a yarn mass of 23.3 tex.

Next, the composite yarn fabric obtained in the present Comparative Example was heated to 250° C. and pressed under a pressure of 3 MPa for 1 minute to manufacture a platy molded article, the moldability was evaluated in exactly the same way as in Example 1, and the bending modulus of elasticity of the molded article was measured. Table 2 shows the results.

Comparative Example 5

In the present Comparative Example, a composite yarn fabric was obtained in exactly the same way as in Example 1 except that one polyamide resin yarn comprising a polyamide resin having a MFR of 110 g/10 minutes and a melting point of 220° C. (PA6; manufactured by TOYOBO CO., LTD., trade name: T-840SF) and having a yarn mass of 23.3 tex was used instead of one polyamide resin yarn comprising a polyamide resin having a MFR of 40 g/10 minutes and a melting point of 220° C. and having a yarn mass of 23.3 tex.

Next, the composite yarn fabric obtained in the present Comparative Example was heated to 250° C. and pressed under a pressure of 3 MPa for 1 minute to manufacture a platy molded article, the moldability was evaluated in exactly the same way as in Example 1, and the bending modulus of elasticity of the molded article was measured. Table 2 shows the results.

TABLE 1

|  | Example 1 | Example 2 | Example 3 | Example 4 |
|---|---|---|---|---|
| Monofilament diameter (µm) | 9 | 9 | 9 | 9 |
| Mass of inorganic multifilament yarns (glass fiber yarns) (tex) | 33.7 | 33.7 | 33.7 | 33.7 |

TABLE 1-continued

|  | Example 1 | Example 2 | Example 3 | Example 4 |
|---|---|---|---|---|
| Glass composition | E | E | E | High-strength high-elastic modulus |
| Resin name of thermoplastic resin yarns | PA6 | PA6 | PPS | PA6 |
| MFR of thermoplastic resin yarns (g/10 minutes) | 40 | 84 | 90 | 40 |
| Mass of resin yarns (tex) | 23.3 | 23.3 | 23.3 | 23.3 |
| Number of resin yarns (yarn) | 1 | 1 | 1 | 1 |
| Content of glass fiber yarns (% by mass) | 59 | 59 | 59 | 59 |
| Moldability | Good | Good | Good | Good |
| Bending modulus of elasticity of molded article (GPa) | 22 | 22 | 25 | 26 |

TABLE 2

|  | Comparative Example 1 | Comparative Example 2 | Comparative Example 3 | Comparative Example 4 | Comparative Example 5 |
|---|---|---|---|---|---|
| Monofilament diameter (μm) | 6.5 | 6.5 | 9 | 9 | 9 |
| Mass of inorganic multifilament yarns (glass fiber yarns) (tex) | 67.5 | 33.7 | 69.1 | 33.7 | 33.7 |
| Glass composition | E | E | E | E | E |
| Resin name of thermoplastic resin yarns | PA6 | PA6 | PA6 | PA6 | PA6 |
| MFR of thermoplastic resin yarns (g/10 minutes) | 40 | 40 | 40 | 33 | 110 |
| Mass of resin yarns (tex) | 23.3 | 23.3 | 23.3 | 23.3 | 23.3 |
| Number of resin yarns (yarn) | 2 | 1 | 2 | 1 | 1 |
| Content of glass fiber yarns (% by mass) | 59 | 59 | 60 | 59 | 59 |
| Moldability | Poor | Poor | Poor | Poor | Good |
| Bending modulus of elasticity of molded article (GPa) | 14 | 18 | 18 | 14 | 15 |

It is clear from Tables 1 and 2 that, according to the composite yarn fabrics of Examples 1 to 4, wherein the mass of the inorganic multifilament yarns is in the range of 10 to 65 tex, the fiber diameter of the monofilaments constituting the inorganic multifilament yarns is in the range of 6.6 to 9.5 μm, the melt flow rate of the thermoplastic resin constituting the thermoplastic resin yarns is in the range of 34 to 100 g/10 minutes, and the ratio of the mass of the inorganic multifilament yarns to the total mass of the composite yarns is in the range of 40 to 90% by mass, excellent moldability (formability) can be obtained, and high strength of a fiber-reinforced molded article (a bending strength of a molded article of 20 GPa or more) can be obtained.

Meanwhile, it is clear that, according to the composite yarn fabrics of Comparative Examples 1 to 5, wherein any of the mass of the inorganic multifilament yarns, the fiber diameter of the monofilaments constituting the inorganic multifilament yarns, and the MFR of the thermoplastic resin constituting the thermoplastic resin yarns is out of the above-mentioned range, enough moldability is not obtained, or enough strength of a fiber-reinforced molded article is not obtained.

The invention claimed is:
1. A composite yarn fabric, obtained by performing weaving using composite yarns as at least one of the warp or the weft, the composite yarns obtained by doubling and twisting inorganic multifilament yarns and thermoplastic resin yarns,
wherein the inorganic multifilament yarns have a mass in a range of 10 to 65 tex,
each of the inorganic multifilament yarns is a bundle of only inorganic monofilaments,
the monofilaments constituting the inorganic multifilament yarns have a fiber diameter in a range of 6.6 to 9.5 μm,
a melt flow rate of a thermoplastic resin constituting the thermoplastic resin yarns is in a range of 34 to 100 g/10 minutes, and
a ratio of a mass of the inorganic multifilament yarns to a total mass of the composite yarns is in a range of 40 to 90% by mass.

2. The composite yarn fabric according to claim 1, wherein the inorganic multifilament yarns are glass fiber yarns.

3. The composite yarn fabric according to claim 1, wherein the thermoplastic resin yarns are polyamide resin yarns.

4. A method for manufacturing a fiber-reinforced resin molded article, comprising:
a molding step of heating and pressing one sheet of a composite yarn fabric or a stacked body in which a plurality of sheets of the composite yarn fabric is stacked, the composite yarn fabric being obtained by weaving using composite yarns as at least one of the warp or the weft, the composite yarns obtained by doubling and twisting inorganic multifilament yarns and thermoplastic resin yarns,
wherein the inorganic multifilament yarns have a mass in a range of 10 to 65 tex,
each of the inorganic multifilament yarns is a bundle of only inorganic monofilaments, the monofilaments constituting the inorganic multifilament yarns have a fiber diameter in a range of 6.6 to 9.5 µm, a melt flow rate of a thermoplastic resin constituting the thermoplastic resin yarns is in a range of 34 to 100 g/10 minutes, and a ratio of a mass of the inorganic multifilament yarns to a total mass of the composite yarns is in a range of 40 to 90% by mass.

5. The method for manufacturing a fiber-reinforced resin molded article according to claim 4, wherein the inorganic multifilament yarns are glass fiber yarns.

6. The method for manufacturing a fiber-reinforced resin molded article according to claim 4, wherein the thermoplastic resin yarns are polyamide resin yarns.

* * * * *